Oct. 17, 1961 M. CAWEIN ET AL 3,005,046

TELEVISION CAMERA

Filed May 19, 1958 2 Sheets-Sheet 1

INVENTORS,
Madison Cawein,
John A. Rado.
BY
Harness, Dickey & Pierce
ATTORNEYS.

Oct. 17, 1961 M. CAWEIN ET AL 3,005,046

TELEVISION CAMERA

Filed May 19, 1958 2 Sheets-Sheet 2

INVENTORS.
Madison Cawein,
John A. Rado.
BY
Harness, Dickey & Pierce
ATTORNEYS.

United States Patent Office 3,005,046

Patented Oct. 17, 1961

3,005,046
TELEVISION CAMERA

Madison Cawein, Fort Wayne, Ind., and John A. Rado, Lancaster, Ohio, assignors to Diamond Power Specialty Corporation, Lancaster, Ohio, a corporation of Ohio Filed May 19, 1958, Ser. No. 736,141
15 Claims. (Cl. 178—7.2)

This invention relates to television systems and more particularly to television cameras.

An object of this invention is to improve the operation of camera tubes of the image dissector type.

Another object of this invention is to improve the operation and to increase the effective gain of an electron multiplier.

Another object of this invention is to provide an improved and simplified automatic gain control system in a television camera.

A further object of this invention is to improve the signal-to-noise ratio in a system including a television camera tube and a video amplifier.

The manner of accomplishing the foregoing objects and other objects and features of the invention will become apparent from the following detailed description of an embodiment of the invention when read with reference to the accompanying drawings in which.

Figure 3:
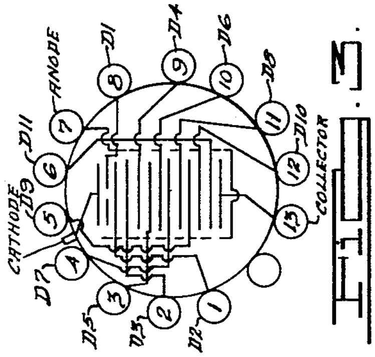
FIG. 3 is a representation of certain of the connections to a particular type of television camera tube.

While certain of the principles of the present invention are applicable to other types of television camera tubes, the invention has been representatively embodied in a television camera utilizing an image-dissector type of camera tube. A satisfactory tube of this type is available on the commercial market under the name "Utilicon," as manufactured by the Diamond Power Specialty Corporation of Lancaster, Ohio, and such a tube is represented in FIGS. 3 and 4 of the drawings.

Figure 4:
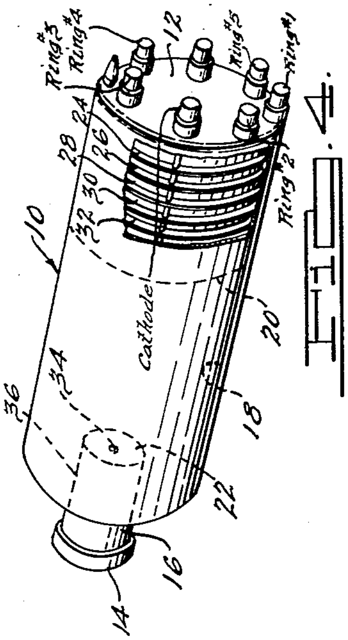
FIG. 4 is a view of the camera tube of FIG. 3 including a representation of certain others of the connections to that tube.

As shown in FIG. 4, the disclosed camera tube comprises an evacuated glass envelope 10 having at one end a transparent glass face 12 and at the other end a tube base 14 mounted to a necked-down portion 16 of the envelope 10. The photosensitive cathode is disposed at the transparent forward face 12 of the tube and, in the noted type of tube, this cathode coating is translucent rather than opaque. Electrical connection is made to the cathode at the appropriately labeled one of the pins mounted on the face 12 of the tube.

When a light image is focused upon the photocathode, the number of electrons which are emitted at each point of the cathode surface varies as a function of the amount of illumination at that point. The entire electron image thus formed is moved rearwardly in the tube by virtue of a positive potential difference which is established (in a manner to be described) between an anode coating 18 upon the inner surface of the tube and the cathode. This anode coating is metallic, such as silver or nickel, and coats the inner wall of the tube approximately from a line 20 to the rear of the tube.

The electron image is maintained intact and focused upon a surface 22 by means of an external focusing coil well known in the art and not illustrated. To improve the shape of the electric field in the vicinity of the cathode and to decrease the amount of S distortion, a series of five concentric rings 24, 26, 28, 30 and 32 are disposed within the tube forward of the anode coating 18 but spaced from one another longitudinally along the tube. These rings are, in practice, labeled ring No. 1 through ring No. 5 and electrical connections are made thereto through the correspondingly labeled terminals at the face 12 of the tube. The nature of the voltages applied to these rings will be discussed hereinafter.

Suitable vertical and horizontal deflecting coils (not shown) are mounted exteriorly of the tube in the well known manner to deflect the entire electron image in a scanning pattern to move successive increments of the electron image into alignment with a minute electron-signal aperture 34 disposed in the surface 22 which is at the forward end of an electron multiplier structure 36. The electron multiplier structure comprises eleven multiplier electrodes, herein termed "dynodes," which are maintained at progressively more positive (less negative) potentials in a manner to be described. In the well known manner, the electrons passing through the aperture 34 in the electron multiplier shield accelerate toward dynode No. 1 which produces, for each such electron, a plurality of secondary electrons. These secondary electrons are attracted to and impinge upon dynodes No. 2 and that dynode in turn produces a plurality of secondary electrons for each such electron which strikes its surface. In this manner, the signal is increased, stage by stage, and is applied to a final electrode which is at a positive potential relative to dynode No. 11 and which is herein termed the "collector." The collector serves as a signal-output electrode.

In the symbolic representation in FIG. 3 of a portion of the internal electrode structure of the camera tube, the cathode connector (which actually appears, as above noted, upon the face 12 of the tube) is illustrated for completeness, the anode is connected to pin No. 7, and dynodes Nos. 1 through 11, labeled in FIG. 3 D1 through D11, are connected to the Nos. 8, 1, 2, 9, 3, 10, 4, 11, 5, 12, and 6 base terminals or pins, respectively, as illustrated.

At certain points in the description of the circuitry in FIGS. 1 and 2 of the drawings, the parameters or values of the components will be given to facilitate an understanding of the principles of the invention, but it is to be understood that those values are solely for that purpose and may be varied within the principles of the invention.

Figure 1:
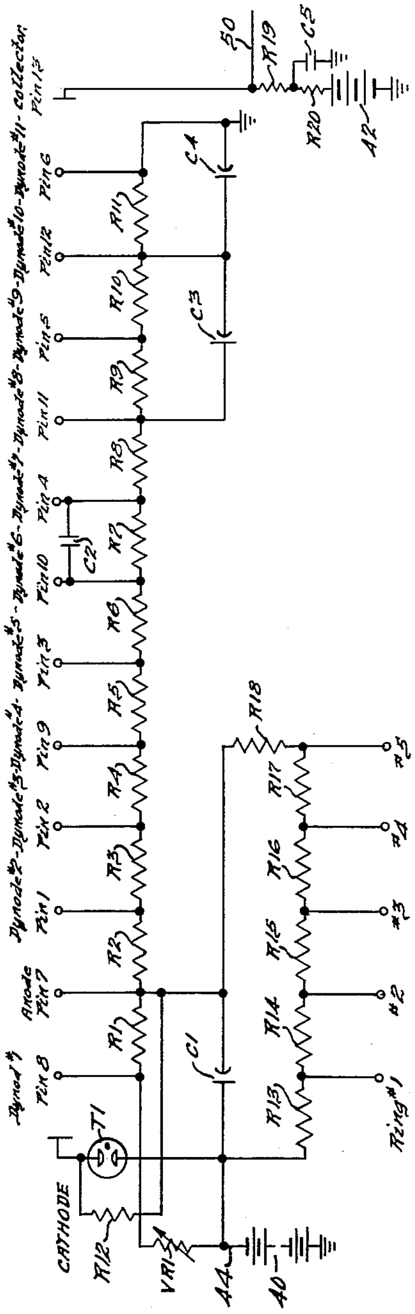
FIGURE 1 is a schematic representation of the power supply and output circuits of a television camera.
Figure 2:
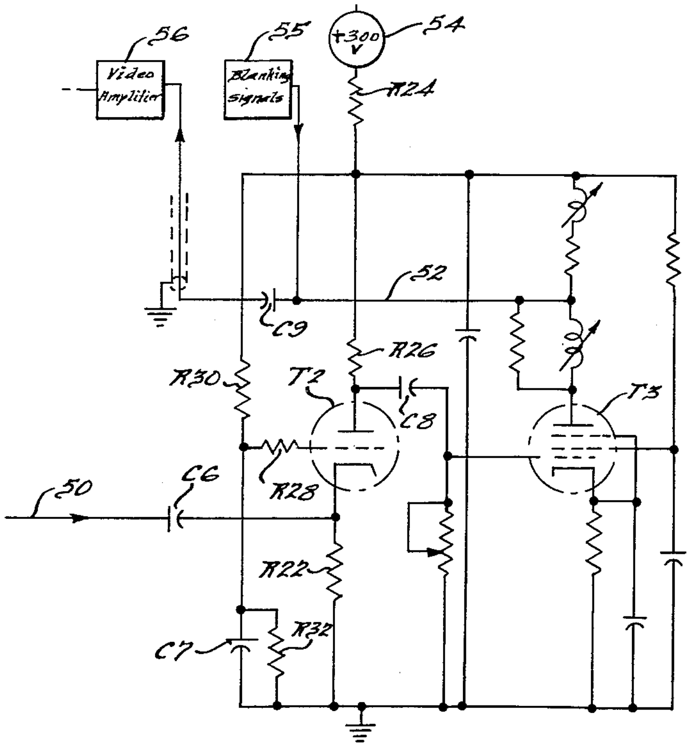
FIG. 2 is a schematic representation of a portion of the circuitry of a television camera, FIG. 2 being placed to the right of FIG. 1 for proper orientation.

In the arrangement illustrated in FIGS. 1 and 2, the requisite voltage differences among the electrodes within the camera tube are established by voltage sources 40 and 42. Voltage source 40, represented, for simplicity, as a battery, will, in accordance with the well known practice, normally take the form of a high voltage supply system such as that incorporating a flyback transformer, a high voltage rectifier and a filter network as conventionally employed in television systems. For purposes of explanation, it may be assumed that voltage source 40 is capable of providing, at conductor 44, a voltage which is 2500 volts negative with respect to ground.

The high negative voltage appearing between conductor 44 and ground is applied across a voltage dividing network comprising variable resistor VR1, and serially interconnected resistors R1 through R11. A further voltage dividing network comprising serially interconnected resistors R13 through R18 is connected in parallel with resistance VR1—R1 and in series with resistors R2 through R11 across voltage source 40.

A capacitor C1 is connected across the auxiliary voltage dividing network comprising resistors R13 through R18, a capacitor C2 shunts resistor R7, capacitor C3 is connected in parallel with the serially interconnected resistors R9 and R10, and capacitor C4 shunts resistor R11. The cathode of the tube is connected to the junction of resistors R1 and R2 through resistor R12 and a neon lamp T1 is connected between conductor 44 and the cathode of the camera tube.

The auxiliary voltage dividing network R13–R18 serves to supply appropriate voltages to the several rings No. 1 through No. 5, while the voltage divider network comprising resistors R1–R11 serves to establish the appropriate voltage differences between the cathode, the anode, the collector, and the several dynodes in the electron multiplier structure. Dynode No. 1 is connected intermediate variable resistor VR1 and resistor R1, the anode is connected to a point intermediate resistors R1 and R2, and dynodes No. 2 through No. 11 are connected to the right-hand terminals of resistors R2 through R11, respectively.

It has previously been understood that the gain-per-stage in an electron multiplier varies with the square root of the stage potential difference. Since a mathematical derivation based upon that understanding demonstrates that the total gain of the electron multiplier would be maximized, for any given supply voltage, if the gain-per-stage were made uniform and hence if the potential differences at the several stages were equal, it has previously been the customary practice to divide the available supply voltage equally among the stages.

However, it has since been discovered that the quantity of secondary electrons which are emitted in the later stages is so great that a space charge tends to build up, producing the effect of a much reduced stage potential difference and resulting in a substantial decrease in the stage gain.

In one solution to this problem, the electron multiplier structure is elaborated to include grid structures in at least the later stages to control the space charge. The somewhat simpler and fully satisfactory solution which constitutes one of the features of the present invention lies in the modification of the stage potential differences to overcome the reduced stage gain among the later stages. This is achieved, with a fixed supply voltage, by reducing the potential differences at the earlier stages and increasing the potential differences at the later stages, as accomplished by employing voltage divider resistors having higher values of resistance for the later than for the earlier stages.

In the preferred arrangement, the values of the effective voltage divider resistance generally increases stage by stage, although it has been found that some variation from rigorous practice of that principle is permissive without unduly reducing the improved overall gain. In a constructed arrangement, resistors R1 and R2 were selected to have values of 47 kilohms and 27 kilohms, respectively, for a total resistance of 74 kilohms, while resistors R3 through R11 were selected to have resistances of 47, 100, 150, 220, 270, 330, 390, 470 and 470 kilohms, respectively. While the sum of the resistances of resistors R1 and R2 is greater than resistor R3, it was found that this relationship was desirable in order to produce the proper voltage at the anode (pin 7) and to produce an adequate voltage difference between dynode No. 1 and dynode No. 2 which would otherwise have been too low due to the effects of the anode current. It is to be understood that the presented values are but representative of the practice of the principles of the invention and that the total resistance of the voltage divider chain may be changed substantially and that the relative values of the voltage divider resistances may be modified without departing from the spirit and scope of the invention.

It will be perceived that, under zero and low signal current conditions, the voltage applied across the later stages will be greater than the voltage applied across the earlier stages and that, in general, the voltage differences will progressively increase stage by stage. Thus, at low signal current conditions, that is, at low illumination levels, the overall gain of the system is increased over that overall gain which would be obtained if the voltage divider resistors were substantially equal. At relatively high values of illumination, the increased return currents will, with the noted parameters, tend to reduce the voltage difference applied across the later stages, reducing the overall gain. While it is within the contemplation of the invention that the values of the voltage divider resistors which are associated with the later stages may be increased over the values presented so as to hold up the overall gain, the advantage accrues from the noted arrangement that the overall gain is reduced at high illumination levels and hence an automatic gain control effect is achieved: the overall gain is maximized when maximum gain is required and is reduced when reduced gain is required.

Reduction of the magnitude of the variation of the average signal current, on an automatic gain control basis, with large variations in the average illumination level is also achieved by the establishment of a further and additional automatic gain control feature. A positive potential is applied to the collector (pin 13) from source 42 through serially interconnected resistors R19 and R20. While source 42 is represented for simplicity as a battery, that voltage source will normally consist of a power transformer, a half- or full-wave rectifier, and a filter, all in the normal manner. Resistor R19, which in ordinary practice is selected to have a relatively low value of resistance (e.g., 1000 ohms), has in the present circuitry a very high value of resistance, in the order of 100,000 ohms to several megohms, a one megohm resistor being employed in a constructed embodiment of the invention. Resistor R20, which is by-passed by capacitor C5, was selected to have a value of 100 kilohms. The direct current component of the collector current is developed across resistors R19 and R20 and, in view of their relatively high values, an increase in the average or direct current component will produce a substantial and significant change in the collector voltage due to the change in the IR drop across those resistors, resulting in a degenerative feedback effect so as to produce automatic gain control. The effect of resistors R19 and R20 from the automatic gain control standpoint is, in a preferred arrangement, of a greater significance and importance than the automatic gain control deriving from the reduced electron multiplier stage gain at high illumination levels, as above discussed. It will be appreciated, howver, that it is not imperative that both of the noted features of the present invention be incorporated in all circuits, each feature being separately advantageous.

The alternating current component of the collector current flows, minorly, to the alternating current ground through resistor R19 and capacitor C5 and, majorly, via conductor 50 (which extends to FIG. 2), coupling capacitor C6 and resistor R22 to ground. The resistance of resistor R22 is preferably very small relative to that of resistor R19, resistor R22 having a value of 1.8 kilohms in a constructed embodiment of the invention. Thus, the effective direct-current load resistance for the collector current is very high while the effective impedance to the alternating current component of the collector current is quite low.

Resistor R22 is connected to the cathode of a triode T2 which is an element of the first video preamplifier stage. The anode of triode T2 is connected to a positive source of plate potential 54 through serially interconnected resistors R24 and R26. The control grid of triode T2, to establish the proper negative bias, is connected through resistor R28 (having a very low value of resistance) to the junction of resistors R30 and R32 which are elements of a voltage divider network also including resistor R24, resistor R32 being by-passed by capacitor C7.

It has previously been the practice in television cameras to connect the camera tube (whether or not it was an image dissector type) to a grounded cathode video preamplifier on the basis of an understanding that such an arrangement produced a maximum signal-to-noise ratio. However, it has been discovered that the use of a grounded grid amplifier, as illustrated, provides a substantial improvement in the signal-to-noise ratio over that previously achieved.

The output signal appearing at the anode of tube T2 is applied through a coupling circuit including capacitor C8 to a conventional grounded cathode amplifier T3 serving as the second video peramplifier stage. The amplified signals appearing upon conductor 52 are then applied, in conjunction with blanking signals derived from a suitable conventional source 55 of such signals, through capacitor C9 to video amplifier 56 which may be of any conventional form. The remainder of the circuitry of the camera may be of any well known type.

While it will be apparent that the embodiment of the invention herein disclosed is well calculated to fulfill the objects of the invention, it will be appreciated that the invention is susceptible to modification, variations and change without departing from the proper scope or fair meaning of the subjoined claims.

What is claimed is:

1. A television camera comprising a camera tube having a photosensitive cathode adapted to produce an electron image when subjected to an illumination pattern, an electron multiplier structure having at least four dynodes constituting at least three adjacent pairs of dynodes and an aperture, means including an anode at a positive potential relative to said cathode for causing electrons emitted by said cathode to enter the aperture in said electron multiplier structure and to impinge upon a first one of said dynodes, a collector electrode positioned adjacent the last one of said dynodes and at a positive potential relative to said last dynode for attracting electrons emitted thereby, and means including a voltage divider network for maintaining at low illumination levels substantially different voltage differences between each of a majority of the successive adjacent pairs of said dynodes comprising a voltage divider resistor for each of said adjacent pairs of dynodes having values of resistance all differing substantially from one another.

2. A television camera comprising a camera tube having a photosensitive cathode adapted to produce an electron image when subjected to an illumination pattern, an electron multiplier structure having a plurality of dynodes and an aperture, means including an anode at a positive potential relative to said cathode for causing electrons emitted by said cathode to enter the aperture in said electron multiplier structure and to impinge upon a first one of said dynodes, a collector electrode positioned adjacent the last one of said dynodes and at a positive potential relative to said last dynode for attracting electrons emitted thereby, and means including a voltage divider network for maintaining at low illumination levels larger voltage differences between the pairs of adjacent dynodes located before said collector and which are nearer the collector than the voltage differences which exist between the pairs of adjacent dynodes which are more remote from the collector comprising a first plurality of voltage divider resistors connected between adjacent ones of the dynodes constituting said pairs of adjacent dynodes which are nearer the collector, and a second plurality of voltage divider resistors connected between the adjacent ones of the dynodes which constitute said pairs of adjacent dynodes which are more remote from the collector and all having values of resistance which are smaller than the resistances of said first plurality of voltage divider resistors.

3. A television camera comprising a camera tube having a photosensitive cathode adapted to produce an electron image when subjected to an illumination pattern, an electron multiplier structure having a plurality of dynodes and an aperture, means including an anode at a positive potential relative to said cathode for causing electrons emitted by said cathode to enter the aperture in said electron multiplier structure and to impinge upon a first one of said dynodes, a collector electrode positioned adjacent the last one of said dynodes and at a positive potential relative to said last dynode for attracting electrons emitted thereby, and means including a voltage divider network for maintaining at low illumination levels a voltage difference between the next two of said plurality of dynodes immediately preceding said collector which is greater than the voltage difference between said first dynode and the next succeeding one of said dynodes comprising a first voltage divider resistor connected between said next two dynodes, and a second voltage divider resistor connected between said first dynode and said next succeeding dynode and having a resistance which is small relative to the resistance of said first resistor.

4. A television camera comprising a camera tube having a photosensitive cathode adapted to produce an electron image when subjected to an illumination pattern, an electron multiplier structure having a plurality of dynodes and an aperture, means including an anode at a positive potential relative to said cathode for causing electrons emitted by said cathode to enter the aperture in said electron multiplier structure and to impinge upon a first one of said dynodes, a collector electrode positioned adjacent the last one of said dynodes and at a positive potential relative to said last dynode for attracting electrons emitted thereby, and means including a voltage divider network for maintaining at low illumination levels voltage differences between the adjacent ones of said dynodes in one group of adjacent dynodes including said last dynode which are large relative to the voltage differences between the adjacent ones of said dynodes in another group of adjacent dynodes including said first dynode comprising a first plurality of voltage divider resistors connected between said adjacent ones of said dynodes in said one group, and a second plurality of voltage divider resistors connected between said adjacent ones of said dynodes in said another group and having values of resistance which are smaller than the resistances of said first plurality of voltage divider resistors.

5. The combination of claim 4 in which the voltage differences between at least certain of the adjacent ones of said dynodes in said one group of adjacent dynodes differ from one another.

6. The combination of claim 4 in which the voltage differences between at least certain of the adjacent ones of said dynodes in said one group of adjacent dynodes differ from one another and in which the voltage differences between at least certain of the adjacent ones of said dynodes in said other group of adjacent dynodes differ from one another.

7. A television camera comprising a camera tube having a photosensitive cathode adapted to produce an electron image when subjected to an illumination pattern, an electron multiplier structure having a plurality of dynodes and an aperture, means including an anode at a positive potential relative to said cathode for causing electrons emitted by said cathode to enter the aperture in said electron multiplier structure and to impinge upon a first one of said dynodes, a collector electrode positioned adjacent the last one of said dynodes and at a positive potential relative to said last dynode for attracting electrons emitted thereby, means including a voltage divider network for maintaining voltage differences between successive adjacent pairs of said dynodes, and means for automatically varying the effective gain of said camera tube comprising load means having a D.C. resistance which is high relative to the A.C. impedance thereof and including a resistor having a relatively high value of resistance connected to said collector and in series with a source of potential difference between said cathode and said collector.

8. The combination of claim 7 in which said resistor has a value in excess of 100,000 ohms.

9. A television camera comprising a camera tube having a photosensitive cathode adapted to produce an electron image when subjected to an illumination pattern, an electron multiplier structure having a plurality of dynodes and an aperture, means including an anode at a positive potential relative to said cathode for causing electrons emitted by said cathode to enter the aperture in said electron multiplier structure and to impinge upon a first one of said dynodes, a collector electrode positioned adjacent the last one of said dynodes and at a positive potential relative to said last dynode for attracting electrons emitted thereby, means including a voltage divider network for maintaining different voltage differences between at least certain of the successive adjacent pairs of said dynodes, and means for automatically varying the effective gain of said camera tube comprising load means having a D.C. resistance which is high relative to the A.C. impedance thereof and including a resistor having a relatively high value of resistance connected to said collector and in series with a source of potential difference between said cathode and said collector.

10. A television camera comprising a camera tube having a photosensitive cathode adapted to produce an electron image when subjected to an illumination pattern, an electron multiplier structure having a plurality of dynodes and an aperture, means including an anode at a positive potential relative to said cathode for causing electrons emitted by said cathode to enter the aperture in said electron multiplier structure and to impinge upon a first one of said dynodes, a collector electrode positioned adjacent the last one of said dynodes and at a positive potential relative to said last dynode for attracting electrons emitted thereby, means including a voltage divider network for maintaining voltage differences between successive adjacent pairs of said dynodes, and circuit means including a source of potential electrically interconnecting said collector and said cathode, said circuit means presenting a relatively high value of resistance to direct current flow which is many times the impedance presented by said circuit means to alternating current flow.

11. The combination of claim 10 in which said circuit means includes the cathode resistor of a voltage amplifying vacuum tube.

12. A television camera comprising a camera tube having a photosensitive cathode adapted to produce an electron image when subjected to an illumination pattern, an electron multiplier structure having a plurality of dynodes and an aperture, means including an anode at a positive potential relative to said cathode for causing electrons emitted by said cathode to enter the aperture in said electron multiplier structure and to impinge upon a first one of said dynodes, a collector electrode positioned adjacent the last one of said dynodes and at a positive potential relative to said last dynode for attracting electrons emitted thereby, means including a voltage divider network for maintaining voltage differences between successive adjacent pairs of said dynodes, means for automatically varying the effective gain of said camera tube comprising a resistor having a relatively high value of resistance connected to said collector and in series with a source of potential difference between said cathode and said collector, and means including a capacitor for connecting said resistor to the cathode of a grounded grid amplifier.

13. The combination of claim 10 in which said circuit means includes a pair of serially interconnected resistors connected in series with said source of potential, one of said resistors having a terminal connected to said collector, a capacitor by-passing the other one of said resistors, and a serially interconnected capacitor and resistor connected to said collector, said last mentioned resistor serving as an input resistor for a voltage amplifier.

14. The combination of claim 2 in which said voltage divider network comprises a plurality of serially interconnected resistances connected across a source of voltage and means for connecting said dynodes to the junctions of successive pairs of said resistances, and in which the values of those of the said resistances which are connected to higher numbered ones of said dynodes are large relative to the values of those of the said resistances which are connected to lower numbered ones of said dynodes.

15. The combination of claim 14 in which the values of a majority of said resistances progressively increase from the lower numbered to the higher numbered dynodes and in which the values of those of the said resistances which are connected to the high numbered dynodes are many times greater than the values of those of the said resistances which are connected to the low numbered dynodes.

References Cited in the file of this patent

UNITED STATES PATENTS

| | | |
|---|---|---|
| 2,160,510 | Moller et al. | May 30, 1939 |
| 2,431,511 | Sanders | Nov. 25, 1947 |
| 2,455,899 | Sanders | Dec. 7, 1948 |
| 2,537,250 | Weimer | Jan. 9, 1951 |
| 2,826,632 | Weimer | Mar. 11, 1958 |
| 2,831,144 | Gibson | Apr. 15, 1958 |

OTHER REFERENCES

RCA Multiplier Phototube 6472, May 1, 1955, RCA data sheet CE-8526 in RCA Tube Handbook HB-3, vol. 3-4. (Copy in Scientific Library.)

RCA Multiplier Phototube 6810-A, August 1957, RCA data sheet 92CJ-9358 in same RCA tube handbook.